March 20, 1928.
H. J. WOLOOHOJIAN
HANDLE PROTECTOR
Filed Nov. 21, 1927
1,662,994
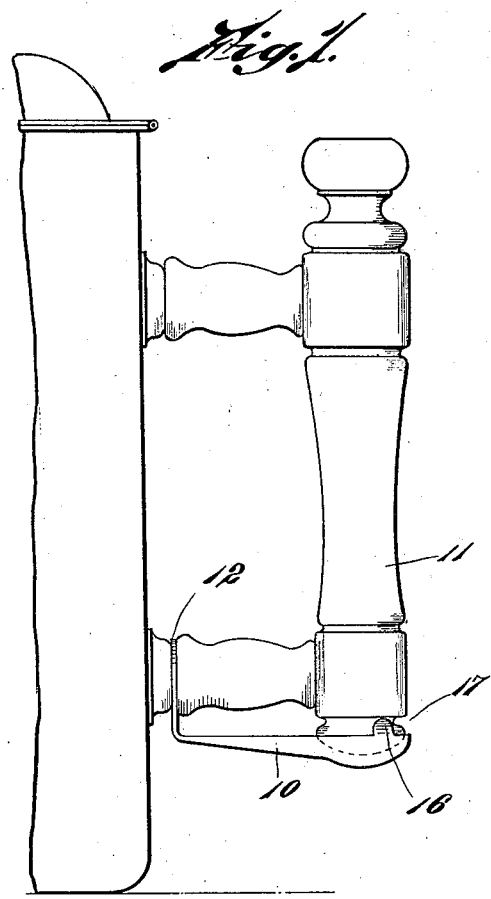
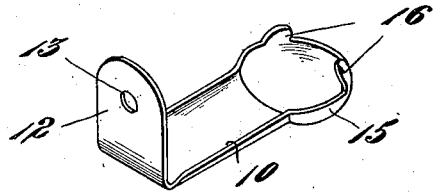
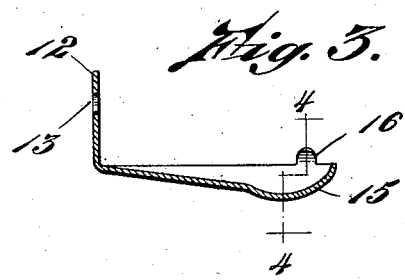
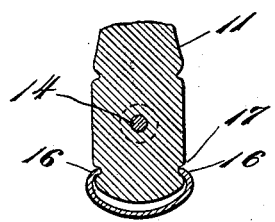
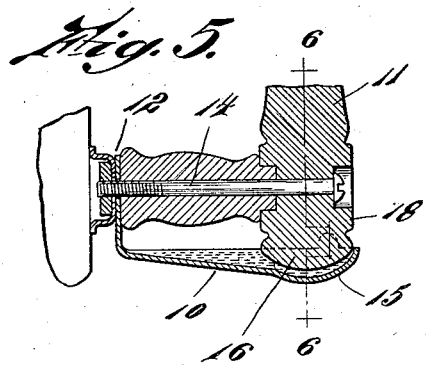
INVENTOR.
Harry J. Woloohojian.
BY
Barlow & Barlow
ATTORNEYS.

Patented Mar. 20, 1928.

1,662,994

UNITED STATES PATENT OFFICE.

HARRY J. WOLOOHOJIAN, OF PROVIDENCE, RHODE ISLAND.

HANDLE PROTECTOR.

Application filed November 21, 1927. Serial No. 234,682.

This invention relates to a handle guard for protecting the lower end of the handle of utensils such as coffee pots, percolators or the like when subjected to a heating flame to prevent the handle from becoming charred or burned by action of the flame upon it; and the object of this invention is to provide a handle protector of this character having a body portion of a length to extend along beneath the handle to be protected, this body portion having an upturned end pierced to receive the fastening bolt and the opposite end of the body being provided with inwardly inclined fingers to engage a recess in the handle to stiffen the same.

A further object of the invention is the forming of this handle protector in channel or trough shape whereby it is straightened and is also adapted to carry a small quantity of water to assist in preventing it from being overheated.

With these and other objects in view, the invention consists of certain novel features of construction, as will be more fully described, and particularly pointed out in the appended claim.

In the accompanying drawings:

Fig. 1 is a side elevation illustrating my improved protector member as applied to the handle of a percolator.

Fig. 2 is a perspective view of the protector member, removed.

Fig. 3 is a central longitudinal section thru the protector.

Fig. 4 is a section on line 4—4 of Fig. 3.

Fig. 5 is a sectional elevation showing the protector as applied to the lower portion of a handle on a coffee pot or percolator.

Fig. 6 is a section on line 6—6 of Fig. 5.

It is found in practice that where the wooden handle of a cooking utensil such as a coffee pot, percolator or other similar device which is designed to be subjected directly to the heat or a flame such as a gas stove or the like, that often times the flame when coming in close proximity to the lower end of the wooden hande will burn or char the same and so soon destroy it. In order to prevent this deteriorating effect of the heat and flame upon this wooden handle, I have provided a protector member which is blanked from sheet stock having a body portion adapted to extend along beneath the handle and having a resilient upturned end portion pierced to receive and be fastened by one of the bolts which secured the handle in position; also to provide a pair of fingers to extend inwardly and engage the handle preferably outside of its axis and so cooperate with the resilient upturned end, the spring of which serves to hold these fingers in contact with the handle to support the free end of its body, the body being preferably formed in channel or trough shape to strengthen it and also permit it to carry a small quantity of water therein if desired to prevent the protector from becoming overheated, the protector member being preferably of a length not to extend beyond the outer portion of the handle so as to prevent burning the hand of the operator if it should come in contact therewith when grasping the handle; and the following is a detailed description of the present embodiment of my invention and showing one means by which these advantageous results may be accomplished.

With reference to the drawings, 10 designates the body portion of the protector which is of a length to extend along the bottom portion of the wooden handle 11. This protector has one end portion 12 turned upwardly and pierced at 13 to receive the fastening bolt 14 to secure the protector in position, the body portion of the protector being preferably formed in channel or trough shape to stiffen the same and its outer end portion 15 is cupped somewhat to receive the rounding end 16 of the handle 11 and the edges of this cup portion is provided with a pair of integral bendable fingers 16 adapted to be folded inwardly to engage the annular groove 17 in the lower end of the handle 11 thereby firmly securing the free end of the protector in operative position on the handle. These fingers 16 are preferably formed to the outer side of the center of the cup portion of the protector so as to engage the groove of the handle on the outer side of its axial line, whereby the spring of the resilient upturned end 12 serves to exert a tension to hold these fingers in contact with the handle and so prevent looseness and rattling thereof. The length of the protector is preferably just sufficient to come to the outer edge 18 of the handle so as not to extend into position to engage and burn the hand of the operator when grasping the handle. By forming this protector member in channel or trough shape, it is also adapted to hold a small quantity of water which serves to lower the temperature of the same when subjected to a high degree of heat.

The device is very simple and inexpensive to construct and is effective in its operation and is very neat in appearance.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A handle protector having a body portion to extend along beneath the handle and having a resilient upturned portion at one end pierced to receive the fastening bolt, the opposite end of the body being cup-shaped to conform to and fit over the end of the handle to which it is attached, the upper edge of the cup-shaped portion towards the outer side of the center of the cup being provided with a pair of integral fingers inclined inwardly to engage a recess in the handle at a point on the outer side of its axial center, whereby the spring of the upturned opposite end of the protector serves to draw these fingers tightly against the stock of the handle to hold the guard tight to support the free end thereof, the outer end portion of the protector being of a length to lie substantially flush with the outer surface of the handle.

In testimony whereof I affix my signature.

HARRY J. WOLOOHOJIAN.